G. W. W. Goodwyn,

Gas Holder.

No. 100,282. Patented Mar. 1, 1870.

Witnesses:

Inventor:
G. W. W. Goodwyn
Per
Attorneys.

United States Patent Office.

GEORGE WILSON WARFIELD GOODWYN, OF NEW ORLEANS, LOUISIANA.

Letters Patent No. 100,282, dated March 1, 1870.

IMPROVEMENT IN COMPRESSED-AIR CYLINDERS.

The Schedule referred to in these Letters Patent and making part of the same

*To all whom it may concern:*

Be it known that I, GEORGE WILSON WARFIELD GOODWYN, of New Orleans, in the parish of Orleans, and State of Louisiana, have invented certain new and useful Improvements in the Construction of Air-Cylinders or Tanks for Containing Compressed Air for Propelling-Purposes; and I do hereby declare that the following is a full, clear, and exact description thereof, which will enable others skilled in the art to make and use the same, reference being had to the accompanying drawings forming part of this specification, in which—

Figure 4:
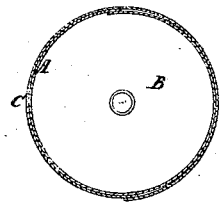

Figure 4, a transverse sectional elevation.

Figure 5, an end view of a section of the inside cylinder.

Similar letters of reference indicate corresponding parts.

The mode of constructing the cylinder is as follows:

First, a sheet, A, of copper or brass, tinned on both sides, is bent into circular form, and the edges lapped and soldered and covered by successive layers or thicknesses of heavy sheet-tin plate, or tinned brass, or galvanized iron, or plated steel.

The object of tinning or plating the same is twofold: First, to prevent the escape of air through the pores of the iron or other metals, and second, to enable the seams to be lapped and soldered, instead of riveting or grooving, as is usually done in such cases, thereby giving it more strength, with less liability to leak.

The conical ends B are then made in a similar way and of the same material, and are then inserted into the open end of the cylinder A until the edge D of the cylinder projects about one inch or more.

Figure 1:
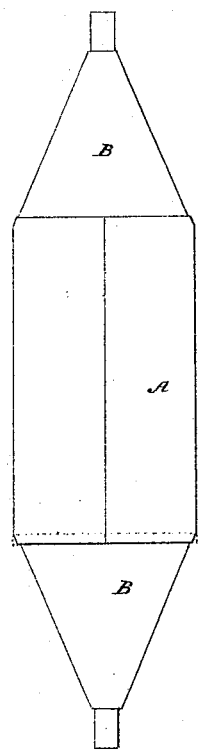
Figure 1 is a view of the interior shell of my improved cylinder or tank.
Figure 2:
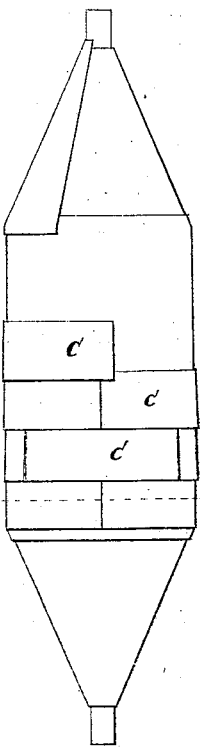
Figure 2 is a view of the same with part of the exterior strengthening-shell applied.
Figure 3:
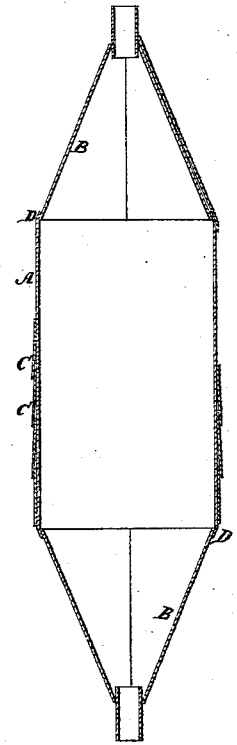
Figure 3 is a longitudinal sectional view of the same.

They are then soldered firmly in that position inside and to the cylinder, soaking the solder well in between the two parts, after which the projecting edges are turned down over the side of the conical ends and again soldered firmly on the outside, as represented in fig. 3, thereby forming joints or seams that are perfectly impervious to air.

I then put on the outside of the cylinder already so formed or made, successive layers or thicknesses of heavy tin-plate C in the following manner: First, by forming the sheets of tin-plate the same circle as the outside of the cylinder A, so as to fit close around the same, and then soldering each sheet separately all around on its four sides or edges, firmly lapping each successive sheet over the edge of the last about one inch or more, as occasion may require, until the whole surface of the same is covered, including the conical ends, when the sheets are lapped over alternately, first the side and then the ends, same as in the first instance, soldering on each successive layer, same as before.

This is repeated until I have a cylinder from two to six or any number of thicknesses which may be required, taking care in each layer to cover, or what is more commonly called breaking seams, so that no two seams will come together, thereby giving to it a combined strength which it would not otherwise have.

The conical ends may be attached with the ends projecting into the cylinders, if preferred, but I prefer to arrange them as shown in the drawing.

Having thus described my invention,

I claim as new, and desire to secure by Letters Patent—

A tank for holding compressed air, formed of parts A B B, each composed of thin sheet copper, covered with successive layers of tin-plate, lapped and soldered together in the manner described.

GEO. W. W. GOODWYN.

Witnesses:
WM. BARRETT,
W. H. TENNEY.